Patented Oct. 23, 1945

2,387,534

UNITED STATES PATENT OFFICE 2,387,534

PRODUCTION OF IMPROVED TITANIUM PIGMENTS

George Reel Seidel, Baltimore, Md., assignor to E. I. du Pont de Nemours & Company, Wilmington, Del., a corporation of Delaware No Drawing. Application May 10, 1941, Serial No. 392,941

10 Claims. (Cl. 106—300)

This invention relates to the manufacture of improved pigments. More specifically it relates to a process for the production of titanium pigments which possess superior fading and weathering resistance upon exposure.

Various surface treatments of titanium pigments with insoluble hydrous metallic oxides have been proposed in the past. The more notable of these is treatment of titanium dioxide with precipitated alumina followed by dewatering and drying. This pigment has shown definite advantages and substantial amounts of pigment has been produced commercially using such a treatment. A more recent treatment comprises the precipitation of both alumina and chromium oxide in the hydrous form on titanium dioxide. Such pigment has been found particularly useful as a delusterant for artificial fibers, particularly cellulose acetate. While this prior art treatment is definitely advantageous when the pigment is to be used in the delustering of artificial cellulosic fibers, it has not been found particularly desirable for certain reasons when used in paints. The reason for this outstanding improvement when used in artificial fibers is not well understood, nor is one able to explain why the improvement and desirability is not carried over into the paint industry to a corresponding degree.

An additional prior art process comprises the treatment of titanium pigments with titanium or zirconium hydroxides. This treatment is particularly advantageous when the pigment is to be used in the manufacture of lithographic inks. This particular surface treatment of the pigment enables the lithographer to avoid the troublesome lithographic break-down which is encountered when using inks containing the untreated pigment. The treated pigment, however, has not found particular favor in the manufacture of exterior paints as the advantages shown in the lithographing industry are not had in the exterior paint field.

More recently the treatment of pigments, and particularly titanium pigments, with insoluble silicates has been proposed. The precipitation of insoluble silicate on pigments notably increases the hiding power of the resulting paint in the case of production of flat interior finishes. The improvement of weather resistance of the silicate treated pigments has been noted in their use but the improvement is considered minor in comparison with the improvement in hiding power.

This invention has as an object the production of surface treated pigments through a modification of the surface properties of the pigment particles. A further object is the production of a titanium pigment possessing improved weather resistance, gloss retention, chalking and fading. A still further object is the production of a surface coated pigment particularly adapted to the production of fade resistant exterior enamels and other exterior paints. Additional objects will become apparent from an examination of the following description and claims.

These objects are attained according to the herein described invention which broadly comprises precipitating a minor amount of at least two amphoteric elements in hydrated compound form upon the surface of a titanium pigment while the latter is in aqueous suspension, at least one of said elements being a metal selected from the fourth group of the periodic table and another being trivalent.

A more specific embodiment of my invention comprises the treatment of a finely divided calcined titanium pigment while in aqueous medium with solutions of compounds of at least two amphoteric elements, followed by adjustment of the pigment suspension to substantial neutrality, thereby precipitating at least one tetravalent element in hydrated compound form and at least one trivalent element in hydrated compound form. The amphoteric elements useful in this invention may be selected from the tetravalent metals of the fourth group which are adapted to give solutions of metallic salts, and having an atomic number of 22 or higher, and also trivalent elements which form metallic salts ionizing in aqueous solution to give positive trivalent cations.

A still more specific embodiment of this invention comprises the treatment of an aqueous suspension of a finely ground calcined titanium dioxide pigment with a solution of a titanic salt and a solution of an aluminum compound, followed by adjustment of the pH to substantial neutrality, dewatering and drying.

It has been found desirable that the amount of fourth group metal employed be not greater than 5%, preferably 2%, calculated as the oxide and based on the weight of the pigment. Further, the amount of the trivalent compound employed is not greater than 5%, preferably 2%, calculated as the oxide and based on the weight of the pigment. It is to be understood that the fourth group metal and the trivalent compound may be used in an amount greater than 5% with results improved over the prior art although the best results are obtained when amounts not greater than 5% are employed.

The best results are obtained when a pH of substantial neutrality is employed although improved results over the prior art are obtained when a pH lower or higher than about 7 is used.

In order that this invention might be more clearly understood and to show specific advantages to be obtained, a large amount of experimental work has been conducted and the resulting products tested for their pigment properties and particularly durability of the resulting paint films. The pigments have been tested both for fading and for chalking resistance and this has necessitated their formulation in paint vehicles. Fading of paint films and particularly enamel paint films has been stressed in this testing work and the methods used for obtaining the results cited in the examples which follow will be recited in some detail.

Coating compositions containing modified alkyd resins have been found particularly useful in the evaluation of my products and several of these will be mentioned in the examples and the data pertaining to the examples. The vehicles used can be classed as urea-alkyds, soybean modified alkyds, and linseed oil modified alkyds. The particular vehicles were selected from the trade and are representative of those obtainable by any paint manufacturer, and are believed to be of the highest quality to be had in the industry. I have found it extremely desirable in the testing of my products to combine the white titanium pigment with an iron blue or a phthalocyanine blue pigment in the oleoresinous vehicles to give a blue exterior enamel. These exterior enamels have been exposed on Florida and Delaware fences and also given an accelerated test in a typical accelerated weathering cabinet, such as are to be found in modern paint laboratories.

The fading of these coating compositions has been found to vary greatly with the treatments given and an arbitrary scale has been evolved for recording the extent of the fading. This scale extends from 0 which means no fading, to 18 which is regarded as the maximum encountered. In the data which follows, the small figures reflect good results while the high figures refer to pigments which are definitely bad. Data and values for fading parallel similar figures for chalking.

The following examples contain products treated in accordance with my invention, as well as products prepared beyond the scope thereof and including the prior art. The material is presented in this manner so that one may see the advantages to be obtained by this novel process. It is understood that these examples are not to be regarded as limitations of this invention.

*Example I*

A titanium dioxide pigment possessing the crystal form of rutile and prepared from a sulfate process was provided so that portions might be removed for a series of four treatments. This pigment was held in the form of a finely divided aqueous suspension. The first portion of the pigment suspension was treated with solutions containing 3 parts of dissolved $TiO_2$ and 2 parts of dissolved $Al_2O_3$ for each 100 parts by weight of pigment in the suspension. The titanium solution used was prepared by the solution of a titanium hydrolyzate in sulfuric acid, while the aluminum was dissolved by means of alkali and was in the form of sodium aluminate. The titanium solution was first added, followed by the sodium aluminate and the pH of the suspension was then adjusted to the neutral point with ammonium hydroxide. The resulting pigment was filtered, washed and dried before testing. The other treatments were similarly made but in one instance chromic sulfate was substituted for sodium aluminate as the treating agent. Since white pigments were being produced it was desirable to decrease the amount of the trivalent metal compound so as to avoid more serious degradation of color. Accordingly the chromium content of the pigment was limited to .5%. The other two treatments were made by the addition of titanium sulfate followed by neutralization with ammonia, and the final one by the addition of aluminum sulfate accompanied by a similar neutralization operation.

Data were obtained for fading and also gloss retention, after formulation in two different alkyd enamels. These enamels were prepared from commercially available vehicles, one of which is designed for baking enamels and the other for air-dry enamels. In the case of the former the panels were baked in accordance with the instructions given by the vehicle manufacturer. The pigment content of the enamels was limited to the product of this example plus enough of a blue pigment to give a definite and desirable blue color.

*Fading of blue enamels (4 months—Florida)*

|  | Alkyd A | Alkyd B |
|---|---|---|
| Ti and Al hydrates | 2 | 3 |
| Ti and Cr hydrates | 2 | 5 |
| Ti hydrate | 10 | 11 |
| Al hydrate | 16 | 18 |

*Gloss retention (4 months—Florida)*

|  | Alkyd A | Alkyd B |
|---|---|---|
| Ti and Al hydrates | 87 | 64 |
| Ti and Cr hydrates | 76 | 61 |
| Ti hydrate | 85 | 25 |
| Al hydrate | 85 | 10 |

Note.—Figures given are gloss meter readings.

*Example II*

A titanium dioxide pigment such as results from the practice of U. S. Patent 2,224,777 was treated with solutions of titanium sulfate, sodium silicate and sodium aluminate in the indicated order. The extent of the treatment was sufficient to give 1% precipitated $TiO_2$, .75% $SiO_2$ and 2% $Al_2O_3$. The pigment suspension after the addition of the last agent was found to have a pH of 5.8 and this was adjusted to slightly in excess of 7.0 by the addition of ammonium hydroxide. The suspension was then filtered, dried and the pigment disintegrated to obtain fineness. This pigment was compared in two different alkyd resin vehicles for fading on Florida fences with a similar pigment except that the silica was omitted from the treatment as well as a third pigment containing only aluminum hydrate. The fading data for these blue enamel panels are found in the table below:

*Fading data (Florida—5 months)*

| Treatment | Alkyd B | Alkyd C |
|---|---|---|
| Ti, Si, Al hydrates | 2 | 5 |
| Al hydrate | 16 | 18 |
| Ti, Al hydrates | 3 | 6 |

Example III

A finely ground pigment substantially the same as that of Example I was divided into four portions and treated with the reagents selected from the group consisting of titanium sulfate, sodium silicate, sodium aluminate and chromic sulfate. The amount of each agent was sufficient to give the treatment listed in the table below. The percentages mentioned there refer to the percentage of the oxide $TiO_2$, $SiO_2$, or $Al_2O_3$ and these were precipitated by adjustment of a solution to substantial neutrality after their addition. These data demonstrate the superiority of pigment containing titanium and aluminum in comparison with a combination treatment of titanium and silicon oxides.

*Fading data (Florida—4 months)*

| Treatment | | | Fading | |
|---|---|---|---|---|
| Ti | Si | Al | Urea/alkyd | Alkyd A |
| Percent | Percent | Percent | | |
| 3 | 7.5 | 2 | 1 | 0 |
| 3 | 0 | 2 | 1 | 1 |
| 3 | 7.5 | 0 | 6 | 8 |

Example IV

This example gives a comparison of nine different treatments in which the treating agents are selected from titanium, zirconium, aluminum, chromium, and silicon. The resulting pigments were exposed as blue exterior enamels using two different vehicles, and the data was obtained using an "Eveready" accelerated cabinet. The data as given in the table below demonstrates the effectiveness of a treatment which contains both a trivalent and a tetravalent metallic element.

*Fading data (Accelerated test—300 hrs.)*

| Treatment | | | | | Fading | |
|---|---|---|---|---|---|---|
| Ti | Zr | Al | Cr | Si | Urea/Alkyd | Alkyd A |
| Percent | Percent | Percent | Percent | Percent | | |
| 1 | 0 | 2 | 0 | .75 | 0 | 1 |
| 1 | 0 | 2 | 0 | 0 | 1 | 0 |
| 1 | 0 | 2 | 0.1 | 0 | 0 | 0 |
| 1 | 0 | 0 | 0.5 | 0 | 0 | 0 |
| 2 | 0 | 0 | 0 | 1 | 6 | 5 |
| 0 | 2 | 0 | 0 | 1.5 | 7 | 5 |
| 0 | 1 | 2 | 0 | 0 | 2 | 2 |
| 2 | 0 | 3 | 0 | 0 | 1 | 0 |
| 0 | 0 | 2 | 0 | 1.5 | 18 | 18 |

It is to be noted that several of the examples given above also include treatment with sodium silicate. This is not a requirement of my present process, and it is understood that it may be practiced either in conjunction with silicate treatment or in the complete absence of the same. My process requires the use of a tetravalent element and a trivalent element in compound form, which may occur in solution and yield positive ions containing the useful treating element. Titanium is the preferred fourth group metal and one which has been found to be particularly useful in this invention although my invention is not limited thereto but includes the other fourth group metals, particularly, zirconium, cerium, thorium, lead and tin. My experimental work with trivalent metals has been largely directed to treatments with salts of aluminum and chromium, although here again my invention includes the use of other trivalent metals such as yttrium, trivalent titanium, boron, and the rare earths. Aluminum is of greater interest than chromium since the latter imparts a color to the finished pigment. This is not material however, when colored finishes and particularly those on the blue or green side of the spectrum are to be manufactured.

It is to be understood that the compound from which the treating agent is precipitated is not critical. The titanium may be derived from titanium chloride as well as titanium sulfate. Aluminum and chromium sulfates have been used but these may be replaced at the wish of the operator. It is possible to use the compounds such as sodium aluminate and in some instances this is to be preferred. This is demonstrated in Example II where sodium aluminate assists in the adjustment of the suspension to the neutral condition. In the preparation of that product the addition of the titanium sulfate lowered the pH to 0.9. The subsequent addition of sodium silicate increased the pH only slightly or to 1.1. The pH after the addition of the sodium aluminate was then 5.8. Needless to say, a smaller quantity of a base such as ammonium hydroxide was needed to obtain substantial neutrality than would have been the case if aluminum sulfate had been used in lieu of the sodium aluminate.

The advantages which have been demonstrated and recorded above for fading resistance have also been demonstrated in the case of chalk resistance. The products containing the combination of titanium hydrate and aluminum hydrate, and particularly those in which the titanium is first added to the pigment suspension as an acid solution, followed by addition of aluminum as sodium aluminate, are particularly outstanding for chalking resistance.

It is to be pointed out that the above examples have been directed to the treatment of both rutile and anatase pigments. Both of these forms of titanium dioxide are available as pigments and my combination treatment has been found effective on both forms. The results with rutile are particularly outstanding and one is able to produce pigments which exhibit superior fade resistance without it being necessary to degrade the hiding power and tinting strength properties as was formerly necessary during a more intensive calcination treatment. The more fade resistant prior art pigments were produced by resort to calcination temperatures in excess of that yielding maximum tinting strength or hiding power, and this is unnecessary when practicing the process herein disclosed. The products not only have superior fade resistance but they also show resistance to checking and cracking and other exterior failure trouble.

The products obtained by the practice of this process find many uses and are not limited to formulation in the vehicles mentioned. They may be used in the straight linseed oil paints, casein water paints, or again they may be used as delusterants in artificial fibers. It is also to be pointed out that the treatment may be more complex than has been described and a number of other agents, including compounds of silicon, may be precipitated onto the pigment containing the agents provided for in this invention. It is possible to use two or more fourth group metals and also two or more trivalent elements. It is also to be understood that this process may be used in the treatment of extended titanium pigments in which the extender may be such materials as calcium carbonate, barium sulfate, or magnesium silicate.

The temperature of precipitation of pigment may be varied over wide ranges. It is often advantageous to make the treatment at an elevated temperature as certain operating advantages are to be derived therefrom. These operating advantages include low moisture content of the filter cakes and the avoidance of thixotropic products in the filtration operation. The temperature preferred to avoid these operating difficulties is usually in the range of from 40° to 80° C. although temperatures outside this range may be employed with improved results over the prior art.

As previously mentioned this invention may be applied to various base pigments. It is advantageous with anatase titanium dioxide pigments such as result from the hydrolysis of titanium sulfate followed by calcination, but a preferred pigment for use is that obtained by the practice of the process of U. S. Patent 2,224,777. It is also possible to improve titanium dioxide pigments which have been converted to rutile during calcination, as well as rutile pigments which have been precipitated in the rutile crystal condition from monobasic acid solutions.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. An improved finely-ground, finished titanium pigment comprising calcined titanium dioxide particles in close association with a minor amount of a precipitate, comprising at least one fourth group tetravalent metal having an atomic number of at least 22 in hydrous oxidic compound form, and at least one trivalent element in hydrous oxidic compound form, said precipitate having been associated with said pigment subject to calcination of the latter.

2. An improved, finely-ground, finished titanium pigment comprising calcined titanium dioxide particles in close association with a minor amount of a precipitate, comprising tetravalent titanium in hydrous form and aluminum in hydrous oxidic form, said precipitate having been associated with said pigment subsequent to calcination of the latter.

3. A process for producing an improved finished titanium pigment which comprises treating said pigment, after calcination and while in aqueous suspension, with at least two soluble compounds of amphoteric metals, one of which is tetravalent and from the fourth group of the periodic table with an atomic number of at least 22, and another of which is in the trivalent condition, maintaining the pH of the resulting mixture such that a reaction product of said compounds is precipitated upon and becomes intimately associated with said pigment, and then recovering the treated pigment which results.

4. A process for manufacturing a finished titanium pigment exhibiting improved fading and weather resistance characteristics which comprises mixing with an aqueous suspension of the previously calcined pigment, a minor amount of at least two soluble compounds of amphoteric metals, one of which is tetravalent and from the fourth group of the periodic table with an atomic number of at least 22, and another of which is in the trivalent condition, adjusting the pH value of the mixture to substantial neutrality to precipitate a small amount of the hydrated reaction product of said amphoteric metal compounds upon said pigment, and then dewatering, drying and recovering the resulting precipitate-treated pigment.

5. A process for obtaining a finished titanium oxide pigment exhibiting improved fading and weather resistance characteristics which comprises treating said pigment, subsequent to calcination and while the same is in aqueous suspension, with a titanic salt and a solution of an aluminum compound, adjusting the pH value of the resulting mixture to substantial neutrality to precipitate a small amount of a hydrate of said metals upon said pigment, and then dewatering, drying and recovering the treated pigment.

6. A process for obtaining a finished titanium oxide pigment exhibiting improved fading and weather resistance characteristics which comprises mixing with an aqueous suspension of the previously calcined pigment a solution of a titanic salt and a solution of an aluminum compound, adjusting the pH of the resulting mixture to substantial neutrality to precipitate on said pigment not to exceed about 5%, calculated as the oxide and based on the weight of the pigment, of a hydrate of said metals, and then dewatering, drying and recovering the treated pigment which results.

7. A process for producing an improved finished titanium pigment exhibiting increased fading and weather resistance characteristics which comprises mixing with an aqueous suspension of the previously calcined pigment, a minor quantity of at least two soluble compounds of amphoteric metals, one of which is tetravalent and from the fourth group of the periodic table with an atomic number of at least 22, the remaining element having a valence of 3 and selected from the group consisting of aluminum and chromium, adjusting the pH value of the resulting mixture to substantial neutrality, whereby a small amount of the resulting precipitate of said metal compounds becomes intimately associated with said pigment, and then dewatering, drying and recovering the treated pigment.

8. A finished, finely-ground, calcined, anatase titanium oxide pigment intimately associated with not more than 5% of the hydrous oxides of both titanium and aluminum, said percentage amount being calculated as the oxide and based on the weight of the pigment, and said oxides having been precipitated on said pigment subsequent to its calcination.

9. A finished, finely-ground, calcined, rutile titanium oxide pigment intimately associated with not more than 5% of the hydrous oxides of both titanium and aluminum, said percentage amount being calculated as the oxide and based on the weight of the pigment, and said oxides having been precipitated on said pigment subsequent to its calcination.

10. A finished, finely-ground, calcined, rutile titanium oxide pigment having intimately associated therewith about 2%, calculated as the oxide and based on the weight of the pigment, of the hydrous oxides of both aluminum and titanium, said oxides having been co-precipitated on said pigment subsequent to its calcination.

GEORGE R. SEIDEL.

CERTIFICATE OF CORRECTION.

Patent No. 2,387,534. October 23, 1945.

GEORGE REEL SEIDEL.

It is hereby certified that error appears in the printed specification of the above numbered patent requiring correction as follows: Page 4, first column, line 43, claim 1, for "subject" read --subsequent--; line 48, for "amomut" read --amount--; and that the said Letters Patent should be read with this correction therein that the same may conform to the record of the case in the Patent Office.

Signed and sealed this 29th day of January, A. D. 1946.

Leslie Frazer (Seal)          First Assistant Commissioner of Patents.